(12) United States Patent
Murphy et al.

(10) Patent No.: US 7,808,381 B2
(45) Date of Patent: Oct. 5, 2010

(54) SYSTEM AND METHOD FOR INTER-MODAL CONTAINER SCREENING

(75) Inventors: William J. Murphy, Woodbridge, VA (US); Francesco Pellegrino, Cold Spring Harbor, NY (US)

(73) Assignee: Lockheed Martin Corporation, Bethesda, MD (US)

(*) Notice: Subject to any disclaimer, the term of this patent is extended or adjusted under 35 U.S.C. 154(b) by 323 days.

(21) Appl. No.: 12/016,818

(22) Filed: Jan. 18, 2008

(65) Prior Publication Data

US 2009/0184818 A1    Jul. 23, 2009

(51) Int. Cl.
*G08B 21/00*    (2006.01)

(52) U.S. Cl. ....................................... 340/540

(58) Field of Classification Search ................. 340/540, 340/545.6, 572.1, 632, 685, 5.8
See application file for complete search history.

(56) References Cited

U.S. PATENT DOCUMENTS

| | | | |
|---|---|---|---|
| 6,936,820 B2 * | 8/2005 | Peoples | 250/336.1 |
| 7,005,646 B1 | 2/2006 | Jordanov et al. | |
| 7,026,944 B2 | 4/2006 | Alioto et al. | |
| 7,116,235 B2 | 10/2006 | Alioto et al. | |
| 7,312,702 B1 * | 12/2007 | Willms et al. | 340/540 |
| 2003/0159523 A1 * | 8/2003 | Renfro | 73/863 |
| 2006/0226998 A1 * | 10/2006 | Wilson | 340/632 |
| 2008/0303664 A1 * | 12/2008 | Huey et al. | 340/552 |

* cited by examiner

*Primary Examiner*—Phung Nguyen
(74) *Attorney, Agent, or Firm*—DeMont & Breyer, LLC

(57) ABSTRACT

A system and method for screening inter-modal shipping containers for the presence of weapons-of-mass-destruction, such as chemical-warfare agents, biological-warfare agents, radiological materials, nuclear material, or explosives, is disclosed.

14 Claims, 5 Drawing Sheets

SYSTEM AND METHOD FOR INTER-MODAL CONTAINER SCREENING

FIELD OF THE INVENTION

The present invention relates to homeland defense in general, and, more particularly, to the screening of inter-modal freight containers for chemical, biological, radiological, nuclear and explosive ("CBRNE") materials.

BACKGROUND OF THE INVENTION

Inter-modal freight transport involves the transportation of freight via multiple modes of transportation (e.g., rail, ocean vessel, and truck) without any handling of the freight itself when changing modes. The advantage of using this method is that it reduces cargo handling, which in turn improves security, reduces damages and loss, and speeds transport.

Inter-modal freight is typically shipped via standardized containers, particularly when one of the modes of transport is aboard ship. Using standardized containers ensures interchangeability between different modes of transportation worldwide.

The standardized containers used for shipping inter-modal freight are known as "inter-modal" or "ISO" containers. The moniker "ISO" derives from the fact that the dimensions of the containers have been defined by the International Organization for Standardization (ISO). These containers are eight feet (2438 mm) wide by eight feet (2438 mm) high. The most common lengths are 20 feet (6096 mm) nominal, 40 feet (12192 mm), 48 feet (14630 mm) and 53 feet (16154 mm), although other lengths exist. The containers are made out of steel and can be stacked on top of each other.

Notwithstanding the many benefits of using inter-modal freight transport, intelligence analysts believe that there is a relatively high potential risk of inter-modal containers being utilized by terrorists to deploy WMDs on U.S. soil. This assessment is based on factors such as (1) the ease of use versus the relative difficulty of detection; (2) the relative security and reliability, from an operational perspective, of commercial maritime container transportation; (3) the adaptive behavior of terrorists to employ methodologies with the history of success consistent with achieving operational objectives (i.e., smuggling via maritime containers); (4) the stated objective of terrorist organizations, such as al Qaeda, of disrupting the U.S. economy and attacking its infrastructure; and (5) the judgment that certain weapons, specifically, improvised radiological and chemical explosive devices, would lend themselves to a commercial maritime platform as a delivery system.

Current law requires inspection of all incoming cargo, but only after the secretary of Homeland Security first determines that a one hundred percent screening system has overcome a variety of technological and economic hurdles. And many interested parties have argued that one hundred percent screening is not technologically or economically feasible, at least currently.

Customs and Border Patrol presently uses intelligence and a risk-based strategy to screen information on one hundred percent of cargo before it is loaded onto vessels destined for the United States. All cargo that is identified as high risk is inspected, either at the foreign port or upon arrival in the United States. Of the approximately 11-million ship-carried cargo containers that arrive at US ports each year, between 5 to 6 percent are randomly inspected.

There have been proposals to instrument all inter-modal containers with a suite of Weapons of Mass Destruction (WMD) detectors. These detectors would monitor the containers for the presence of one or more of the following: chemical warfare agents, biological warfare agents, radiological materials, nuclear materials, and explosives, and provide an alarm upon detection of any of these materials. But with millions of containers in use, and a cost per container for adequate instrumentation in the range of hundreds of thousands of dollars, such an approach would be prohibitively expensive.

SUMMARY

The present invention provides a way to quickly, efficiently, and inexpensively screen 100 percent of inter-modal containers arriving at U.S. ports for the presence of chemical or biological warfare agents, radiological materials, nuclear material, or explosives.

In accordance with the illustrative embodiment of the present invention, an integrated suite of CBRNE detectors is located on the "spreader bar" of a container crane or at another dockside location in the vicinity of a cargo ship. Air emanating from a container vent, either on top or on the sides of each cargo container, is sampled. The sampling procedure can be performed in less than a minute, for example, as the container is hoisted from a cargo ship and transferred dockside or vice-versa.

Air is either passively or actively sampled from the inter-modal container. For passive sampling, natural airflow out of the container is relied on. For active sampling, air is suctioned from a vent on the container or compressed air is forced into an opposing container vent.

In yet some further embodiments of active sampling, containers are modified with the installation of two standard commercial quick-connect couplings. One coupling provides a compressed-air inlet and the other coupling serves as a container sampling location. Fittings for mating with the quick-connect couplings are disposed on the mating end of an air hose and a sample line. The couplings should be sufficiently separated to insure that the ambient air within the container, as opposed to simply the compressed air being added, is driven out through sample line. In some embodiments, one coupling is installed near the bottom of the container at one end (compressed air inlet) and the second coupling is installed near the top of the container at the other end to serve as the sampling location. Attachment and withdrawal of compressed air and sample lines can be performed manually or in automated fashion using, for example, robotic arms.

The sampled air is analyzed in real time for CBRNE signatures and, in some embodiments, compared to nominal background signatures (e.g., particulate size distribution and count, chemical signature, etc.) expected for the contents of any given container. In some embodiments, the detector suite includes an airborne particle counter (for biological agents), an ultra-violet laser-induce fluorescence detector (for biological agents), an ion mobility spectrometer and/or mass spectrometer (for chemical and explosives detection), and an alpha, beta, gamma detector (for detecting radiological or nuclear materials).

In some embodiments, the screening system incorporates a data processing system. The data processing system receives, processes and stores information pertaining to each container in a data base. Typical information for each container includes, without limitation, container ID number, container weight, container size, container-model type, point of origin, sender identification, destination, recipient identification, and contents identification. In some embodiments, an RFID tag is attached to each container. This enables each container to be tracked at discrete points (e.g., ports and centralized transfer points, etc.). In some other embodiments, a machine-readable identification code is provided on each container for tracking and identification purposes. In the present context, "machine readable" means readable by an optical scanner, video-processing system, etc.

In some further embodiments, CBRNE detectors are networked with the data processing system, and information flows therebetween. For example, data pertaining to the nominal background signature is input in to the data processing system and stored in the data base for later reference. Alternatively, given the contents of the container, the data processing system can estimate a background signature. In some embodiments, results from CBRNE detectors are transmitted to the data processing system where the detected signature is compared to the expected background signature. If the detected signature exceeds the expected background signature by a predetermined threshold, then an alarm is issued. Alternatively, all processing can be done locally at the CBRNE detector.

As previously indicated, the sampling process can be accomplished within the nominal amount of time required for dockside cargo-transfer operations. As a consequence, the present system and method for detection does not delay the shipping process. Furthermore, since the detectors are located on a crane or at another dockside location, relatively few such detector units are required at any particular transfer point. As a consequence, the cost of implementation is far less than for scenarios wherein each container is provided with a suite of detectors.

DETAILED DESCRIPTION

Figure 1:
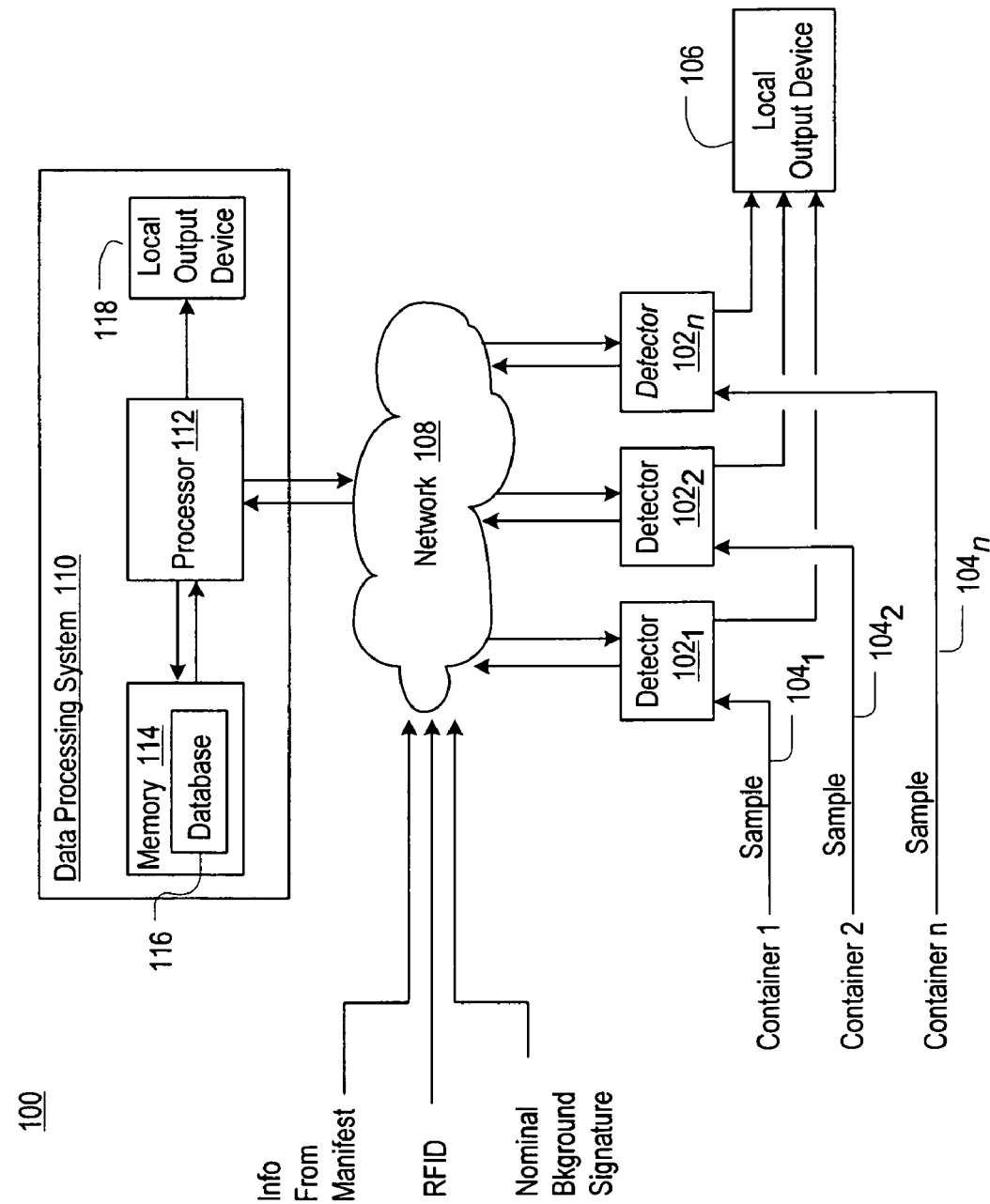
FIG. 1 depicts a system for inter-modal container screening according to the illustrative embodiment of the present invention.

The illustrative embodiment of the present invention is a system and method for the screening of inter-modal freight containers for one or more of: chemical warfare agents, biological warfare agents, radiological materials, nuclear weapons, and explosives.

Definitions of Terms.

Weapon-of-mass-destruction (WMD). There are a variety of definitions of the term "weapon-of-mass-destruction." The meaning has evolved over time and varies with the organization that provides the definition (e.g., the U.S. military, U.S. civil defense, U.S. FBI, etc.) In colloquial use, a "WMD" is a weapon which can kill large numbers of humans, animals and plants, and/or cause great damage to man-made structures (e.g., buildings, etc.) or natural structures (e.g., mountains, etc.). For use herein, "WMD" includes explosives as well as chemical or biological warfare agents, radiological isotopes, or nuclear weapons.

CBRNE. This acronym stands for weaponized or non-weaponized chemical warfare agents, biological warfare agents, radiological isotopes, nuclear weapons and explosives. Weaponized materials can be delivered using conventional bombs (e.g., pipe bombs, etc.), improved explosive materials (e.g., fuel oil-fertilizer mixture, etc.) and enhanced blast weapons. Non-weaponized materials are traditionally referred to as Dangerous Goods (DG) or Hazardous Materials (HAZMAT) and can include contaminated food, livestock and crops. As used herein, "CBRNE" is synonymous with "WMD."

Chemical warfare agent. A chemical warfare agent or chemical weapon includes those that are effective because of their toxicity; that is, their chemical action can cause death, permanent harm or temporarily incapacitate.

A common way to classify chemical agents is according to their degree of "effect" (i.e., harassing, incapacitating or lethal). This approach to classifying chemical agents is not particularly precise because the effects of chemical agents will depend on the dose received, and on the health and other factors that affect how susceptible people are to the agent.

Another form of classifying chemical agents is based on their effects on the body. Classifications include: nerve agents, respiratory agents, and blister agents. Nerve agents (e.g., Sarin, Soman, Tabun, VX, etc.) gain access to the body usually through the skin or lungs, and cause systemic effects. Respiratory agents (chlorine, phosgene, etc.) are inhaled and either cause damage to the lungs, or are absorbed there and cause systemic effects. Blister agents are absorbed through the skin, either damaging it (e.g., mustard gas, lewisite, etc.) or gaining access to the body to cause systemic effects or both.

A further classification is based on the duration of the hazard: persistent and non-persistent. Persistent agents remain in the area where they are applied for long periods (sometimes up to a few weeks). They are generally substances of low volatility that contaminate surfaces and have the potential to damage the skin if they come into contact with it. A secondary danger is inhalation of any vapors that may be released. Mustard gas and VX are examples of persistent agents. Non-persistent agents are volatile substances that evaporate or disperse quickly, and may be used to cause casualties in an area that the group using the weapons wants to occupy soon thereafter. Surfaces are generally not contaminated. The primary danger is from inhalation, and secondary danger is from skin exposure. Hydrogen cyanide and phosgene are typical non-persistent agents.

Biological warfare agent. Biological warfare agents or biological weapons are weapons that achieve their intended effects by infecting people with disease-causing microorganisms and other replicative entities, including viruses, infectious nucleic acids and prions.

The chief characteristic of biological agents is their ability to multiply in a host over time. The disease they may cause is the result of the interaction between the biological agent, the host (including the host's genetic constitution, nutritional status and the immunological status of the host's population) and the environment (e.g., sanitation, temperature, water quality, population density, etc.). Biological agents are commonly classified according to their taxonomy (i.e., fungi, bacteria, viruses). This classification is important because of its implications for detection, identification, prophylaxis and treatment. Biological agents can also be characterized by other features, such as infectivity, virulence, lethality, pathogenicity, incubation period, contagiousness, mechanisms of transmission, and stability, all of which affect their potential to be used as weapons.

Typical biological warfare agents of concern are Bacillus anthracis, Brucellus, Bubonic Plague, Tularemia, viruses, such as Venezuelan Equine Encephalitis (VEE).

Radiological material. A radiological weapon is any weapon that is designed to spread radioactive material with the intent to kill, and cause disruption upon a city or nation. It is primarily known as a "dirty bomb" because it is not a true nuclear weapon and does not yield the same destructive power. It uses conventional explosives to spread radioactive material, most commonly the spent fuels from nuclear power plants or radioactive medical waste.

Radiological weapons can render a great deal of property useless for an extended period, unless costly remediation is undertaken. The radiological source and quality greatly impacts the effectiveness of a radiological weapon. Factors such as: energy and type of radiation, half-life, size of explosion, availability, shielding, portability, and the role of the environment will determine the effect of the radiological weapon. Radioisotopes that pose the greatest security risk include: 137Cs, used in radiological medical equipment, 60Co, 241Am, 252Cf, 192Ir, 238Pu, 235U, 90Sr, and 226Ra. All of these isotopes, except for 226Ra, are created in nuclear power plants. While the amount of radiation dispersed from the event will likely be minimal, the fact that any radiation is dispersed may be enough to cause panic and disruption.

Nuclear weapons. There are two basic types of nuclear weapons. One produces its explosive energy through nuclear fission reactions alone. These are known colloquially as "atomic bombs." The second basic type of nuclear weapon produces a large amount of its energy through nuclear fusion reactions, and can be over a thousand times more powerful than fission bombs. These are known colloquially as "hydrogen bombs" or "thermonuclear bombs."

There are other types of nuclear weapons as well. For example, a boosted fission weapon is a fission bomb which increases its explosive yield through a small amount of fusion reactions, but it is not a hydrogen bomb. Some weapons are designed for special purposes; a neutron bomb is a nuclear weapon that yields a relatively small explosion but a relatively large amount of radiation; such a device could theoretically be used to cause massive casualties while leaving infrastructure mostly intact and creating a minimal amount of fallout. A salted bomb results when a nuclear weapon is surrounded by suitable materials, such as cobalt or gold. This device can produce exceptionally large quantities of radioactive contamination.

Explosives. For use herein, the term "explosives" includes conventional (not nuclear) and high-yield conventional explosives. Typical examples include TNT, PETN, C4, as well as fertilizers and certain peroxides.

CBRNE Detector. There is no single device or method that is capable of "detecting" the presence of chemical warfare agents, biological warfare agents, radiological/nuclear materials, and high-yield explosives. As a consequence, a "CBRNE detector" is, more accurately, a suite of detectors. Each detector in the suite might be suitable for detecting one or perhaps two of the five CBRNE categories. As used herein, the term "CBRNE detector" is understood to be one or more bundled detectors as a function of how many and which of the five primary weapon categories are being screened for.

Detectors types. The choice of detector will be a function of the required sensitivity, the ability to detect a suitably wide range of agents within the particular class being monitored (e.g., the number of different chemical warfare agents that can be detected, etc.), the speed of detection, and the suitability of the detector for the form of the sample (in the case of the present invention, the sample is an air sample). In conjunction with the present disclosure, those skilled in the art will be able to select detectors suitable for detecting one or more of chemical warfare agents, biological warfare agents, radiological and nuclear materials, and/or explosives.

For chemical warfare agents, detection options include surface acoustic wave sensors, electrochemical sensors (e.g., amperometric response of an enzyme biosensor, chemi-resistive vapor techniques, etc), spectrophotometric sensors, and immunochemical sensors. Due to the complex nature of the chemical warfare agents and their matrices, non-separation-based analytical methods often experience interferences, which result in false positive or negative responses. Thus, some type of separation method is often coupled to an analytical detector to provide more specificity of response and a broader range of application. The most common separation devices are gas chromatography, liquid chromatography, capillary electrophoresis, ion mobility spectrometry, and mass spectrometry.

For biological warfare agents, detection options include aerosol particle sizers, flow cytometry, ultra-violet laser-induced fluorescence detector. For identification, as opposed to simply detection, there are immunoassay-based detectors, genetic-based detectors, mass spectroscopy (with separation via gas chromatography or liquid chromatography), and surface acoustic wave sensors.

For radiological and nuclear materials, an alpha particle, beta particle, and gamma particle detector is typically used.

For explosives, an ion mobility spectrometer and/or mass spectrometer is typically used.

FIG. 1 depicts system 100 for screening inter-modal freight containers according to the illustrative embodiment of the present invention. In the illustrative embodiment, system 100 includes a plurality of CBRNE detectors $102_1$, $102_2$, $102_n$ (collectively referenced "detectors 102"), a corresponding plurality of sample lines $104_1$, $104_2$, $104_n$ (collectively referenced "sample lines 104"), local output device 106, and data processing system 110.

Detectors 102 are located "dockside" at a port facility. As described in further detail later in this specification, detectors 102 can be situated at one of several locations on the dockside. In preferred embodiments, detectors 102 will be located in the immediate vicinity of a ship that is in dock to off-load or receive inter-modal freight containers. As per the definitions previously provided, each CBRNE detector 102 comprises at least one (and typically more than one) detection device to provide the desired scope of screening (e.g., C and E only, or C, E, R, and N, etc.).

In the illustrative embodiment, the specific number of CBRNE detectors 102 that are sited dockside is a function of the number of inter-modal containers that can be processed in parallel fashion. In particular, if there are ten cranes for transferring containers between a ship and the dockside, then there will advantageously be ten CBRNE detectors 102 for screening ten containers in parallel. In such embodiments, the screening process is intended to be accomplished within the nominal time it takes to transfer an inter-modal container between a ship and the dock. If this target is achieved, the screening process will not extend the time otherwise required for cargo transfer.

In some other embodiments, all inter-modal containers at a particular port are processed in serial fashion, such that a single CBRNE detector 102 is used. In some of such embodiments, the containers are placed on a slowly-moving conveyor. As each container passes a screening location, CBRNE detector 102 obtains a sample, analyzes it in real time, and, as appropriate, the container is advanced for transport or held for further inspection, etc.

In the illustrative embodiment, CBRNE detectors 102 are networked to data processing system 110 via network 108. Network 108 can be a private network, a virtual private network, internets, or the Internet, or combinations thereof. Communications to and from network 108 can be wireless, wire line, or a combination thereof. In some other embodiments, however, inter-modal container screening system 110 is not networked and, in fact, operates substantially independently of data processing system 110.

Data processing system 110 includes processor 112, data storage device 114, and output device 118.

Processor 112 is advantageously a general-purpose processor as is well-known in the art that is capable of:
  receiving data from and outputting data to network 108;
  executing one or more programs that are stored in data storage device 114;
  storing data in and retrieving data from data storage device 114;
  providing data to output device 118.

Data storage device 114 is advantageously a non-volatile memory, such as a hard disk, for storing program code executed by processor 112 and for storing the data, in the form of database 116, that is input into and generated by data processing system 110.

Output device 118 is video display or speaker, such as can be used for issuing an alarm to indicate the suspected presence of a CBRNE material in an inter-modal container.

Data processing system 110 is used in various ways in different embodiments. For example, and without limitation, the data processing system can be used:
  simply as a database for maintaining information about each inter-modal container passing through a particular port and have no communication with CBRNE detectors 102;
  as a database for maintaining inter-modal container information and as a processor for estimating nominal background signature as a function of the contents of each inter-modal container being handled at a port.
  as a database for maintaining inter-modal container information and as a processor for receiving detector results and, based on those results, for determining whether or not to issue an alarm indicating a likely presence of CBRNE materials.

In some embodiments, database 116 of information pertaining to the inter-modal containers that are entering/leaving a port is maintained. The information pertaining to the inter-modal containers includes one or more of the following items, among anything else:
  Information from the manifest or shipping papers associated with an inter-modal container, including the contents of the container, point of origin, destination, sender, recipient, etc.
  An RFID tag number and listing of "way points" that document the shipping history of an inter-modal container.
  A background signature (e.g., particulate size distribution and quantity, etc.) that is determined (i.e., measured) at the point of origin for any given inter-modal container or as may be determined by computer modeling from other manifest data (e.g., contents, etc.). In some embodiments, this information accompanies the shipping documents; in some other embodiments, this information is separately provided.

In the illustrative embodiment in which screening system 100 operates in conjunction with data processing system 110, the system operates as follows.

CBRNE detectors $102_1$, $102_2$, ... $102_n$, operating in parallel, obtain a sample of air from respective inter-modal containers 1, 2, ... n over respective sample lines $104_1$, $104_2$, ... $104_n$. The CBRNE detectors analyze the samples and transmit the results of the analysis, via network 108, to processor 112 in data processing system 110.

The processor analyzes the results and, if appropriate, sends a signal to output device 118 to issue a warning regarding the presence of a CBRNE agent. In embodiments in which output device 118 is a video monitor, the warning will be a displayed on the screen for an operator. In embodiments in which output device 118 is a speaker, the warning will be a siren or pre-recorded message. In some embodiments, the warning is issued both over both video monitor(s) and speaker(s).

In some embodiments, the analysis that is performed by processor 112 includes comparing the results obtained from each CBRNE detector to the nominal background signature for the specific inter-modal container. In some cases, the nominal background signature is measured at the point of origin of the container, reported to data processing system 110, and stored in database 116. In some other cases, processor 112 estimates a background signature based on the information provided in the manifest, etc., such as the reported contents of the container.

However obtained, the comparison is performed and, if the current measurements exceed the background signature by some threshold amount, an alarm is issued at output device 118.

In some other embodiments, there is no comparison performed to any measured or estimated background CBRNE signature. Rather, the results from CBRNE detectors 102 are compared to an a priori established "threshold" values for each type of measurement. If a reading exceeds a threshold, an alarm is issued at output device 118.

In addition to output device 118, which is situated in a control facility, in some embodiments, there are additional local output devices 106 situated near the various CBRNE detectors 102. If an alarm condition exists, the alarm is broadcasted over local output device 106 as well.

In some embodiments, the processing described above is performed within each of the CBRNE detectors 102 rather than via processor 112 in data processing system 110. In some of these embodiments, the relevant background CBRNE signature information is transmitted from data processing system 110 to detectors 102 via network 108. If the issuance of an alarm is warranted, this is can be done via output device 106, 118 or both.

The foregoing description provides examples of detectors 102 operating in conjunction with data processing system 110. In some embodiments, samples are obtained, analyzed, and processed independently of data processing system 110. In such embodiments, to the extent that a background CBRNE signature is used for analysis, the signature can bypass data processing system 110 and be transmitted directly to detectors 102 over network 108 or manually input.

It will be appreciated that there are various levels of integration possible between CBRNE detectors 102 and data processing system 110, some of which have been disclosed above. In conjunction with this disclosure, those skilled in the art will know how to implement and operate screening system 100 at any desired level of integration.

Figure 2:
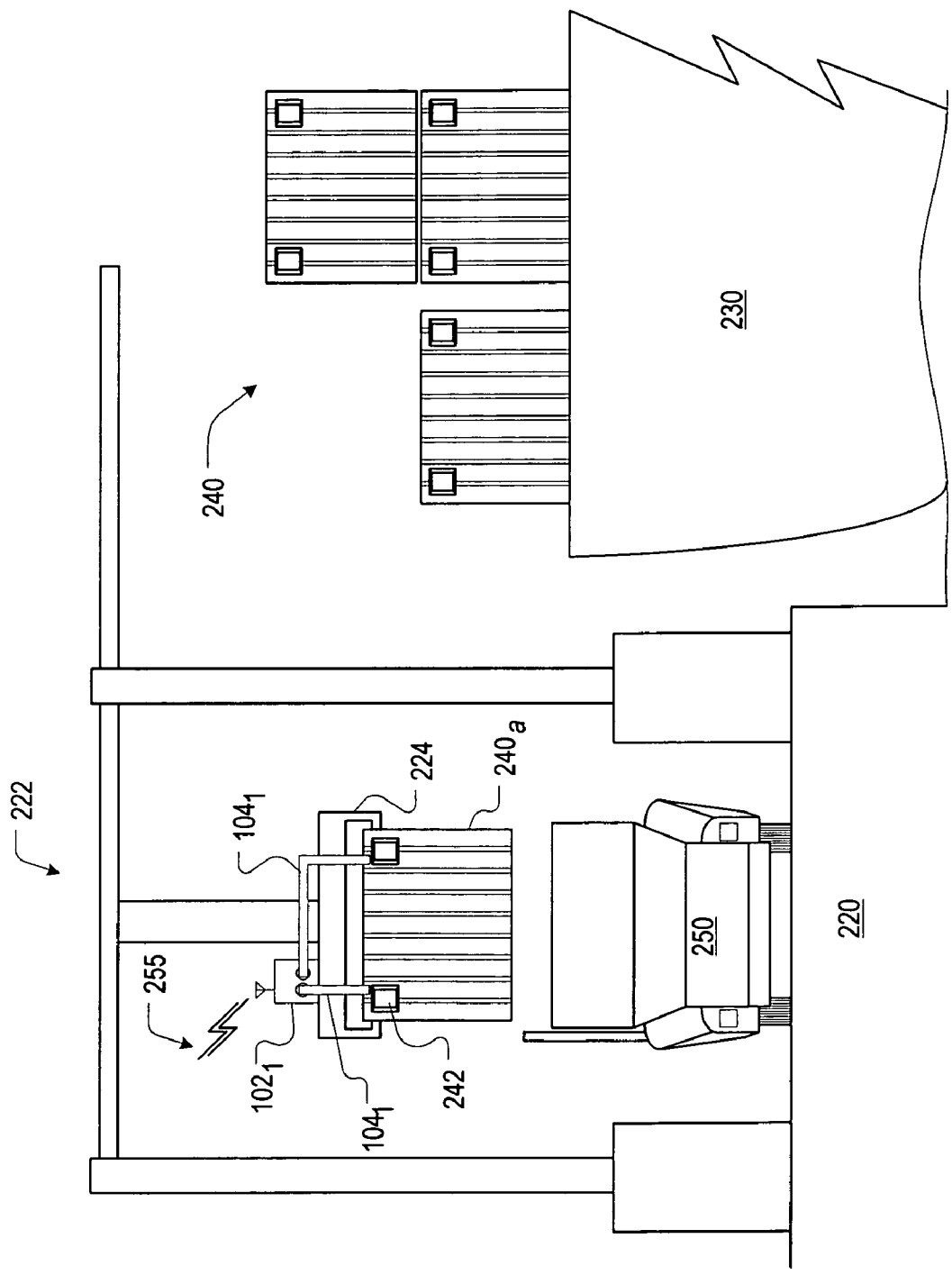
FIG. 2 depicts a first arrangement for inter-modal container wherein the detector is disposed on a cargo crane.
Figure 3:
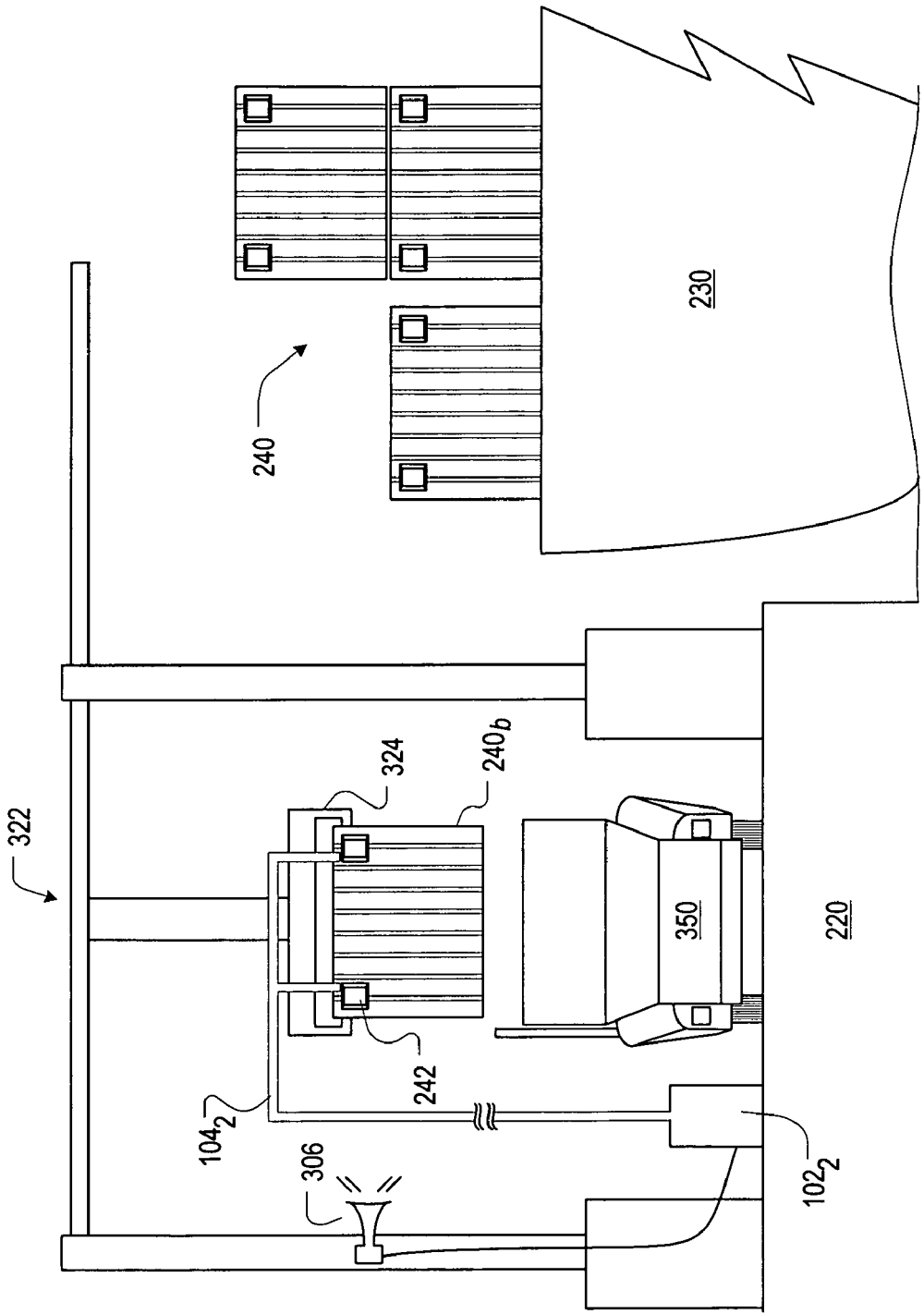
FIG. 3 depicts a second arrangement for inter-modal container screening wherein the detector is disposed at a dockside location other than on the crane.
Figure 4:
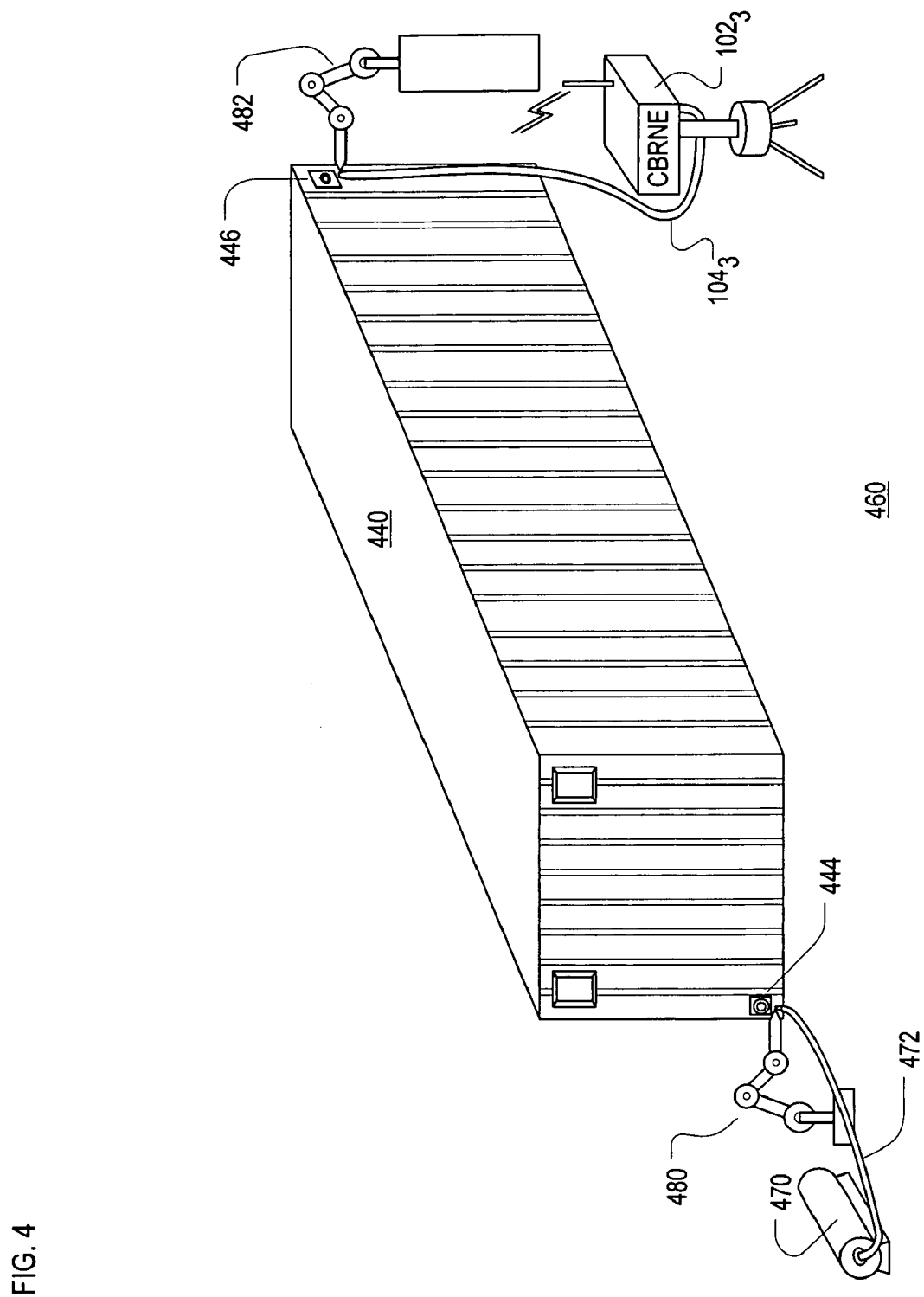
FIG. 4 depicts a third arrangement for inter-modal container screening.

FIGS. 2-4 depict further details of how an air sample is obtained, for several specific embodiments, from an inter-modal container in accordance with the present invention.

FIG. 2 depicts an embodiment in which CBRNE detector 102 is disposed on the "spreader bar" of an overhead crane at a dock.

FIG. 2 depicts cargo ship 230 in port, wherein there are inter-modal containers 240 on the deck of the ship. The containers are to be off-loaded at dock 220 for further transport by truck 250. On the dockside is overhead cargo crane 222 having spreader bar 224. FIG. 2 depicts crane 222 transferring one of inter-modal containers, in particular container $240_a$, onto truck 250.

CBRNE detector $102_1$ is disposed on spreader bar 224. Sample lines $104_1$, which deliver a sample to the detector, are positioned near vents 242 on inter-modal container $240_a$. The vents are normally present on many inter-modal containers and appear at standard locations. As a consequence, in some embodiments, rigid sample lines $104_1$ are piped to appropriate locations for drawing air samples from vents 242.

Some inter-modal containers 240 are presently designed to create a flow out of vents 242. In some embodiments, sample lines $104_1$ take advantage of this natural draft to (passively) draw an air sample.

In some additional embodiments, a suction or vacuum flow is created in sample lines $104_1$ to facilitate drawing an air sample from vents 242. In some embodiments, a pump, etc., is connected to sample lines $104_1$ for this purpose. Alternatively, CBRNE detector $102_1$ itself can have the capability to create suction flow in sample line $104_1$.

In some further embodiments, compressed air is injected into other vents 242 or couplings on container 240 to actively generate an air flow through the container to facilitate the sampling process. In some of those embodiments, vents 242 or, more preferably, an air feed line (not depicted in FIG. 2), is suitably modified to facilitate the introduction of compressed air or gases into the inter-modal container. For example, in some embodiments, a mask-like fixture that is dimensioned and arranged to fit over vent 242 and seal against the exterior of the container is advantageously disposed at the discharge end of an air feed line.

In some alternative embodiments, robotic arms (not depicted in FIG. 2) are disposed on spreader bar 224. The robotic arms are used, in some embodiments, to move air feed lines (not shown) and/or sample lines $104_1$ towards (or away from) vents 242 for sampling.

In still further embodiments, quick-connect couplings are installed in the inter-modal containers and mating fittings are installed on the end of air feed lines and/or sample lines $104_1$. In such embodiments, the robotic arms are used to couple/decouple the air feed lines and/or sample lines to the quick-connect fittings. (See, FIG. 4 and the accompanying description for further disclosure concerning the use of quick-connect fittings in conjunction with the present invention.)

CBRNE detector $102_1$ is shown to be wirelessly transmitting signal 255. The signal, which includes data that is representative of the results of the CBRNE analysis of the air sample from container $240_a$, is ultimately intended for data processing system 110 (see, e.g., FIG. 1) for processing.

It will be appreciated that if dock 220 includes additional, appropriately positioned overhead cranes 222, each with its own CBRNE detector, the containers can be off-loaded and screened in parallel.

FIG. 3 depicts an embodiment in which a CBRNE detector is on dock 220 proximal to crane 322 and ship 230.

Like FIG. 2, FIG. 3 depicts cargo ship 230 with inter-modal containers 240 on deck. The containers are to be off-loaded at dock 220 for further transport by truck 350. On the dockside is overhead cargo crane 322 having spreader bar 324. This Figure depicts crane 322 transferring one of inter-modal containers, in particular container $240_b$, onto truck 350.

Sample lines $104_2$ are advantageously rigid in the vicinity of spreader bar 324 so that they are appropriately positioned to obtain a sample from vents 242. But sample line $104_2$ is otherwise flexible and suitably long to accommodate the movement of overhead crane 322 between ship 230 and dock 220.

In the embodiment depicted in FIG. 3, processing of the data obtained from CBRNE detector $102_2$ is performed at the detector itself. This embodiment depicts detector $102_2$ hardwired to speaker (local output device) 306. If and when detector $102_2$ determines that there is a likelihood that a chemical warfare agent, biological warfare agent, radiological isotope, nuclear weapon, or explosive is present within a container being screened, an audible alarm would issue over speaker 306.

FIG. 4 depicts a further arrangement for obtaining an air sample from an inter-modal container in accordance with the presence invention. In the embodiment depicted in FIG. 4, inter-modal container 440 has been modified, before use, by the addition of two quick-connect couplings 444 and 446. In the embodiment that is depicted in FIG. 4, coupling 444 is disposed on one end of container 440 near the bottom. Coupling 446 is disposed on the opposite end of container 440 near the top.

Source 470 of compressed air (e.g., an air compressor, bottled compressed air, etc.) is capable of being coupled to quick-connect coupling 444 via air hose 472. The air hose includes an appropriate fitting for attaching to coupling 444.

Sample line $104_3$ is capable of being coupled to quick-connect coupling 446 to provide an air sample from inter-modal container 440 to CBRNE detector $102_3$. The sample line includes a fitting that is appropriate for attaching to coupling 446. The compressed air that is injected into container 440 creates an air flow that facilitates the sampling process.

In the embodiment that is depicted in FIG. 4, robotic arm 480 is used to couple and decouple air hose 472 from quick-connect coupling 444. Likewise, robotic arm 482 is used to couple and decouple sample line $104_3$ from quick-connect coupling 446. In some other embodiments, the coupling/decoupling operations are performed manually.

In the embodiment that is depicted in FIG. 4, the location of various robotic arms 480 and 482, source of compressed air 470, and CBRNE detector $102_3$ defines a screening station 460. In other words, the inter-modal containers 440 are brought to the screening station, such as via a slow-moving conveyor. Thus, all containers 440 are advantageously screened, in serial fashion, for CBRNE at screening station 460 after being off-loaded from a ship or before being loaded onto a ship.

Figure 5:
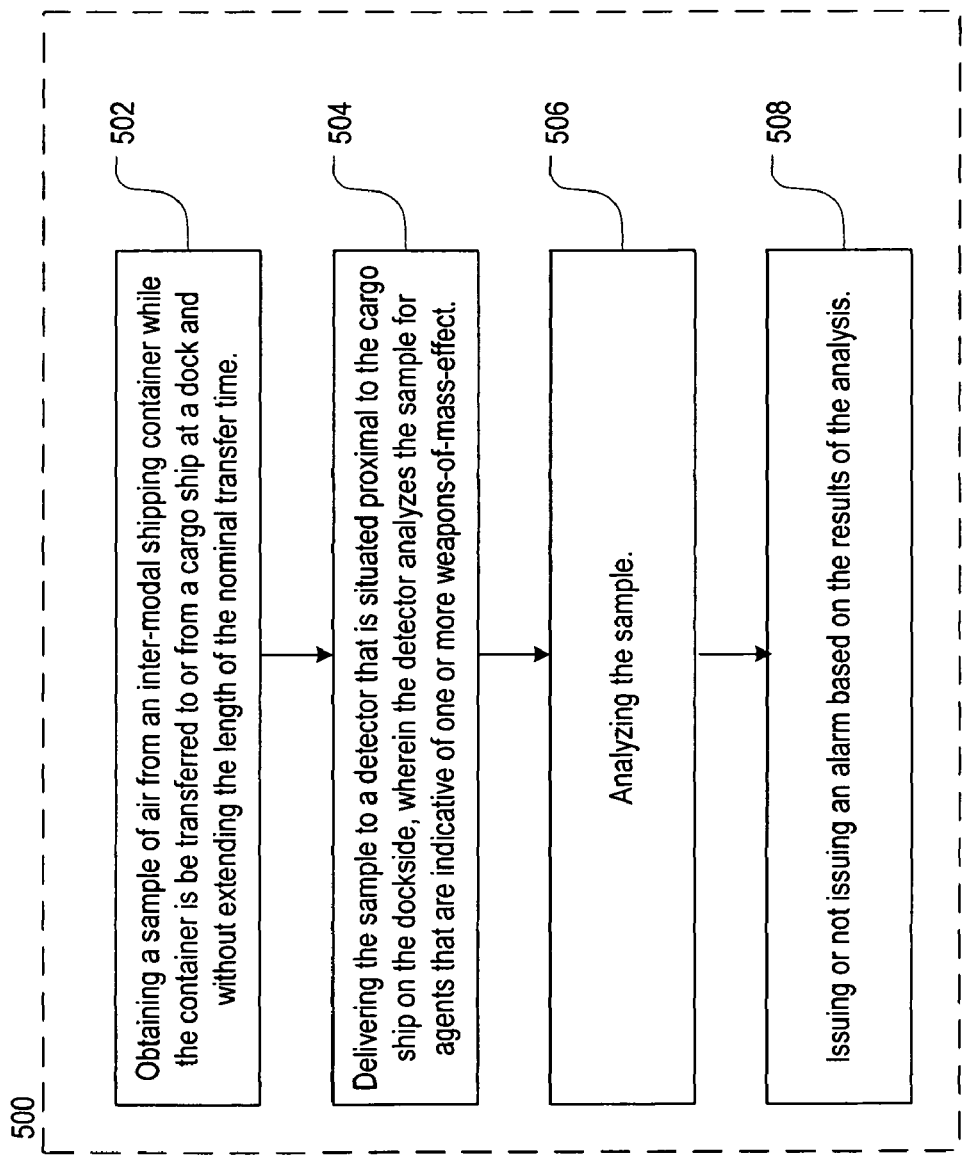
FIG. 5 depicts a method for inter-modal container screening according to the illustrative embodiment of the present invention.

FIG. 5 depicts method 500 for screening inter-modal containers in accordance with the illustrative embodiment of the present invention.

According to operation 502, a sample of air is obtained from an inter-modal shipping container while the container is dockside or being transferred between a ship and the dock. The sample is advantageously obtained within the time that it normally takes to transfer cargo. The sample is obtained in any of the ways previously described.

In accordance with operation 504, the sample is provided to a CBRNE detector that is located dockside proximal to a cargo ship. Several suitable dockside locations have been disclosed above.

The sample is analyzed, and the results are processed, as per operation 506. The analysis and processing have been previously described.

In operation 508, if the analysis warrants, an alarm is issued.

It is to be understood that the disclosure teaches just a few examples of embodiments consistent with the present invention and that many additional variations of the invention can easily be devised by those skilled in the art after reading this disclosure and that the scope of the present invention is to be determined by the following claims.

What is claimed is:

1. A networked CBRNE detection and reporting system for inter-modal freight, comprising:
    a plurality of networked CBRNE detectors for parallel screening of inter-modal containers at a plurality of screening sites, wherein each detector is capable of detecting one or more agents in a sample of air drawn from an inter-modal container, wherein the agents are indicative of the presence of at least one weapon-of-mass-destruction in the inter-modal container, and further wherein the detectors are at a dockside location;
    a sample line at each screening site, wherein a first end of the sample line is coupled to the detector and a second end of the sample line is suitably positionable to obtain the sample of air from the inter-modal container at each screening site;
    a data processing system, wherein the data processing system:
    (a) is networked to the plurality of detectors;
    (b) receives information from each detector pertaining to the sample of air obtained from each inter-modal container;
    (c) receives first information from a shipping manifest for each inter-modal container;
    (d) analyzes the information pertaining to the sample and the first information for each inter-modal container to determine whether a weapon-of-mass-destruction is present therein; and
    a device for issuing an alarm, wherein the alarm issues when the data processing system determines that a weapon-of-mass-destruction is present in one of the inter-modal container at one of the screening sites.

2. The system of claim 1 further comprising a device that actively withdraws the sample of air from the inter-modal container.

3. The system of claim 1 and further wherein the the first information comprises a measured background signature for each of the inter-modal shipping containers to be screened, wherein the measured background signature provides an amount of the one or more agents that were in each inter-modal shipping container at the point of origin thereof.

4. The system of claim 1 and further wherein the data processing system transmits, to one of the detectors, at least some the first information for one of the inter-modal shipping containers.

5. The system of claim 1 and further wherein the first information comprises a listing of the contents of the associated inter-modal container.

6. The system of claim 5 and further wherein the data processing system estimates a background signature that provides an amount of the one or more agents that are expected to be in the sample of air from each inter-modal container based on the listing of the contents provided in the associated shipping document.

7. The system of claim 1 wherein the detector is disposed on a crane that is used to transfer the inter-modal container between a ship and dockside.

8. The system of claim 7 further comprising a robotic arm, wherein the robotic arm is disposed on the crane, and further wherein the robotic arm moves the second end of the sample line.

9. A CBRNE detection and reporting system for inter-modal freight, comprising:
    a CBRNE detector for detecting one or more agents in a sample of air from an inter-modal container, wherein the agents are indicative of the presence of at least one weapon-of-mass-destruction in the inter-modal container, and further wherein the detector is at a dockside location;
    a sample line, wherein a first end of the sample line is coupled to the detector and a second end of the sample line is suitably positionable to obtain the sample of air from the inter-modal container;
    a device for issuing an alarm, wherein the alarm issues when analysis of the sample by the detector indicates the presence of a weapon-of-mass-destruction in the inter-modal container;
    a first quick-connect coupling and a second quick-connect coupling, wherein the first and second quick-connect couplings are disposed on the inter-modal container
    a first hose, wherein a first end of the first hose is coupled to a source of compressed air and a second end is capable of being coupled to the first quick-connect coupling;
    a first robotic arm for coupling and decoupling a first hose to the first quick-connect coupling; and
    a second robotic arm for coupling and decoupling the sample line to the second quick-connect coupling.

10. The system of claim 9 and further wherein the second robotic arm moves the second end of the sample line to a vent of the inter-modal container to obtain the sample.

11. A method for screening a plurality of inter-modal containers at a first screening site and at a second screening site for the presence of weapons-of-mass-destruction, the method comprising:
    obtaining a first sample of air from a first inter-modal container being screened at the first screening site and obtaining a second sample of air from a second inter-modal container being screened at the first screening site, wherein each sample is obtained
    without extending a nominal container-transfer time;
    delivering the first sample of air to a first CBRNE detector that is situated at a the first screening site, wherein the first detector is capable of analyzing the first sample of air for a first agent that is indicative of a presence of one or more weapons-of-mass-destruction;
    delivering the second sample of air to a second CBRNE detector that is situated at the second screening site, wherein the second detector is capable of analyzing the second sample of air for the first agent that is indicative of a presence of one or more weapons-of-mass-destruction;
    transmitting a first analysis of the first sample of air and a second analysis of the second sample of air, via a network, to a data processing system;

transmitting first information related to a background signature for the first inter-modal shipping container and second information related to a background signature for the second inter-modal shipping container, via the network, to the data processing system;

analyzing the first sample of air by comparing an amount of the first agent therein to a first background signature based on the first information and analyzing the second sample of air by comparing an amount of the second agent therein to a second background signature based on the second information; and issuing an alarm if the analysis indicates a likelihood of the presence of a weapon-of-mass-destruction in the first or second inter-modal container.

12. The method of claim 11 wherein the operation of transmitting first information further comprises obtaining the background signature for the first inter-modal container from a shipping document that is associated with the first inter-modal container.

13. The method of claim 11 wherein the operation of transmitting first information further transmitting the stated contents of the first inter-modal container.

14. The method of claim 13 wherein the operation of analyzing the first sample of air further comprises calculating the first background signature based on the stated contents of the first inter-modal container.

* * * * *